(12) United States Patent
Miller, Jr. et al.

(10) Patent No.: US 12,385,725 B2
(45) Date of Patent: Aug. 12, 2025

(54) MULTIFUNCTION PRIMER POCKET CORRECTION TOOL AND METHOD OF USING SAME

(71) Applicant: K&M Shooting Products, LLC, Holland, MI (US)

(72) Inventors: Roger G. Miller, Jr., West Olive, MI (US); David A. Allen, Grandville, MI (US)

(73) Assignee: K&M Shooting Products, LLC, Holland, MI (US)

( * ) Notice: Subject to any disclaimer, the term of this patent is extended or adjusted under 35 U.S.C. 154(b) by 0 days.

(21) Appl. No.: 18/675,013

(22) Filed: May 27, 2024

(65) Prior Publication Data

US 2024/0393092 A1     Nov. 28, 2024

Related U.S. Application Data

(60) Provisional application No. 63/469,284, filed on May 26, 2023.

(51) Int. Cl.
*F42B 33/10* (2006.01)
*B23C 3/00* (2006.01)

(52) U.S. Cl.
CPC .............. *F42B 33/10* (2013.01); *B23C 3/007* (2013.01)

(58) Field of Classification Search
CPC .................................. F42B 33/04; F42B 33/10
See application file for complete search history.

(56) References Cited

U.S. PATENT DOCUMENTS

| | | | | |
|---|---|---|---|---|
| 361,966 A * | 4/1887 | Morse | ..................... | F42B 33/10 86/24 |
| 1,463,603 A * | 7/1923 | Talcott | ................... | F42B 33/001 86/23 |
| 2,807,186 A * | 9/1957 | Veum | ..................... | F42B 33/10 86/30 |
| 2,825,259 A * | 3/1958 | Novak | .................... | F42B 33/10 86/36 |
| 4,163,410 A * | 8/1979 | Dillon | ................... | F42B 33/004 86/36 |
| 4,405,269 A * | 9/1983 | Hertzler | .................. | B23B 51/10 408/239 R |
| 4,517,716 A * | 5/1985 | Eberhart | .................. | F42B 33/04 86/19.6 |
| 4,535,540 A * | 8/1985 | Morgan | ................ | B26F 1/3846 30/360 |
| 4,590,841 A * | 5/1986 | Davis | ...................... | F42B 33/04 86/36 |
| 4,807,511 A * | 2/1989 | Markle | ................... | F42B 33/04 86/24 |

(Continued)

*Primary Examiner* — Derrick R Morgan
(74) *Attorney, Agent, or Firm* — Frank M. Scutch, III

(57) ABSTRACT

A multifunction primer pocket correction tool that combines three cutting features in a single hand tool for use in ammunition reloading. The tool operates to cut the primer pocket depth, removes the military crimp and chamfers the leading edge of the flash hole in a single process. This combined tool includes a new technology in an external flash hole chamfer. This adds another level of safety and consistency with each casing, while still chamfering, and end milling the primer pocket, all while using the base of the casing as a backstop for consistent depth of cut.

6 Claims, 5 Drawing Sheets

(56) References Cited

U.S. PATENT DOCUMENTS

| | | | | |
|---|---|---|---|---|
| 5,066,174 | A * | 11/1991 | Smith | B23B 51/107 |
| | | | | 408/202 |
| 5,125,316 | A * | 6/1992 | Markle | F42B 33/10 |
| | | | | 86/24 |
| 5,200,571 | A * | 4/1993 | Gracey | B08B 1/36 |
| | | | | 15/198 |
| 5,649,464 | A * | 7/1997 | Gracey | F42B 33/10 |
| | | | | 408/72 R |
| 5,649,465 | A * | 7/1997 | Beebe | F42B 33/10 |
| | | | | 86/24 |
| 6,397,718 | B2 * | 6/2002 | Jamison | B23B 29/248 |
| | | | | 86/24 |
| 8,376,665 | B2 * | 2/2013 | Kirby | B23B 51/126 |
| | | | | 408/239 R |
| 9,970,741 | B1 * | 5/2018 | Eldredge | B23B 5/00 |
| 12,259,224 | B1 * | 3/2025 | Petrangelo | F42B 33/04 |
| 2008/0286061 | A1 * | 11/2008 | Lefebvre | B25D 17/088 |
| | | | | 408/226 |
| 2016/0018203 | A1 * | 1/2016 | Giraud | F42B 33/10 |
| | | | | 86/24 |
| 2017/0067726 | A1 * | 3/2017 | Keska | F42B 33/10 |
| 2018/0361483 | A1 * | 12/2018 | Goodman | F42B 35/02 |
| 2019/0128655 | A1 * | 5/2019 | Peters | F42B 33/10 |

* cited by examiner

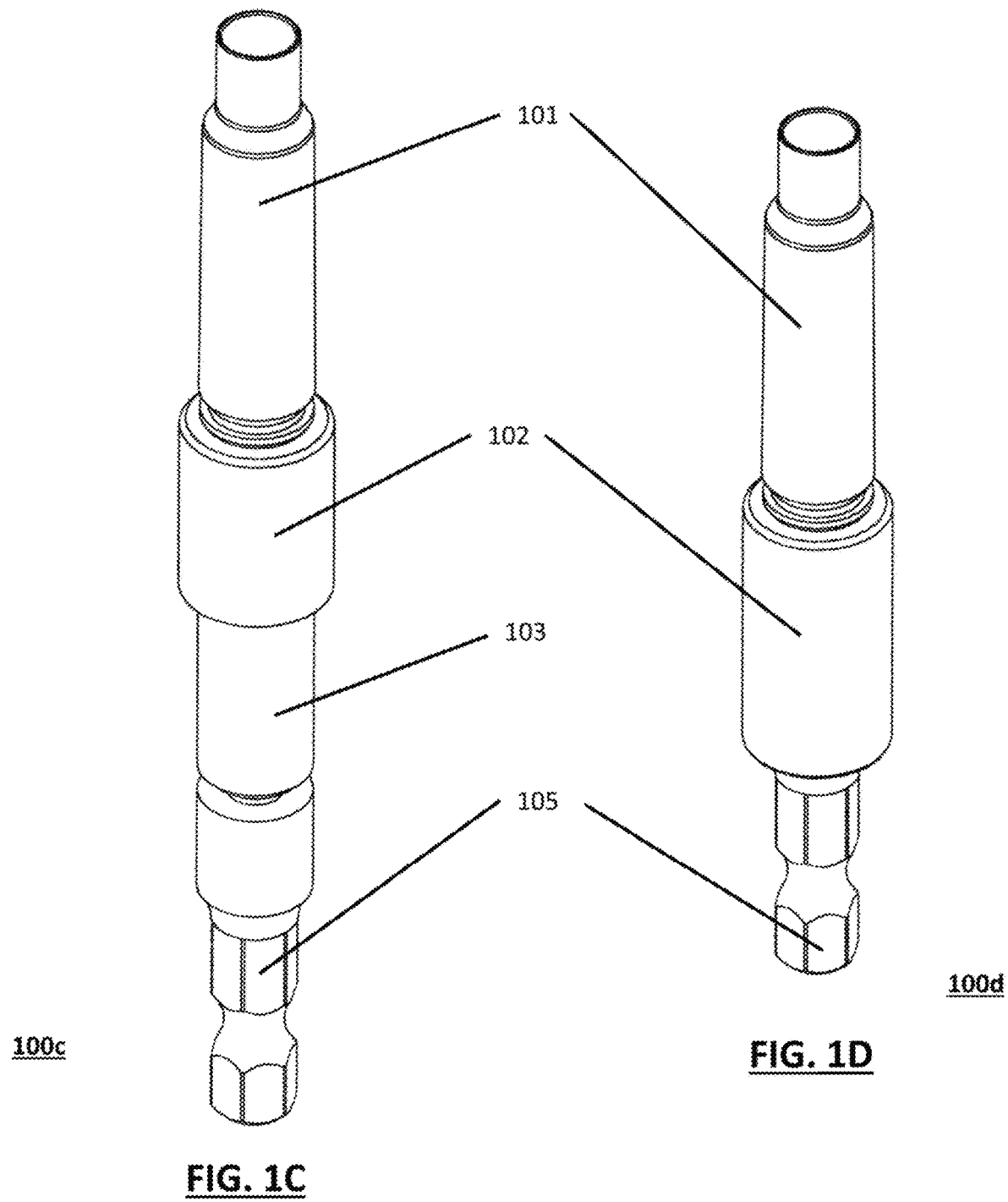

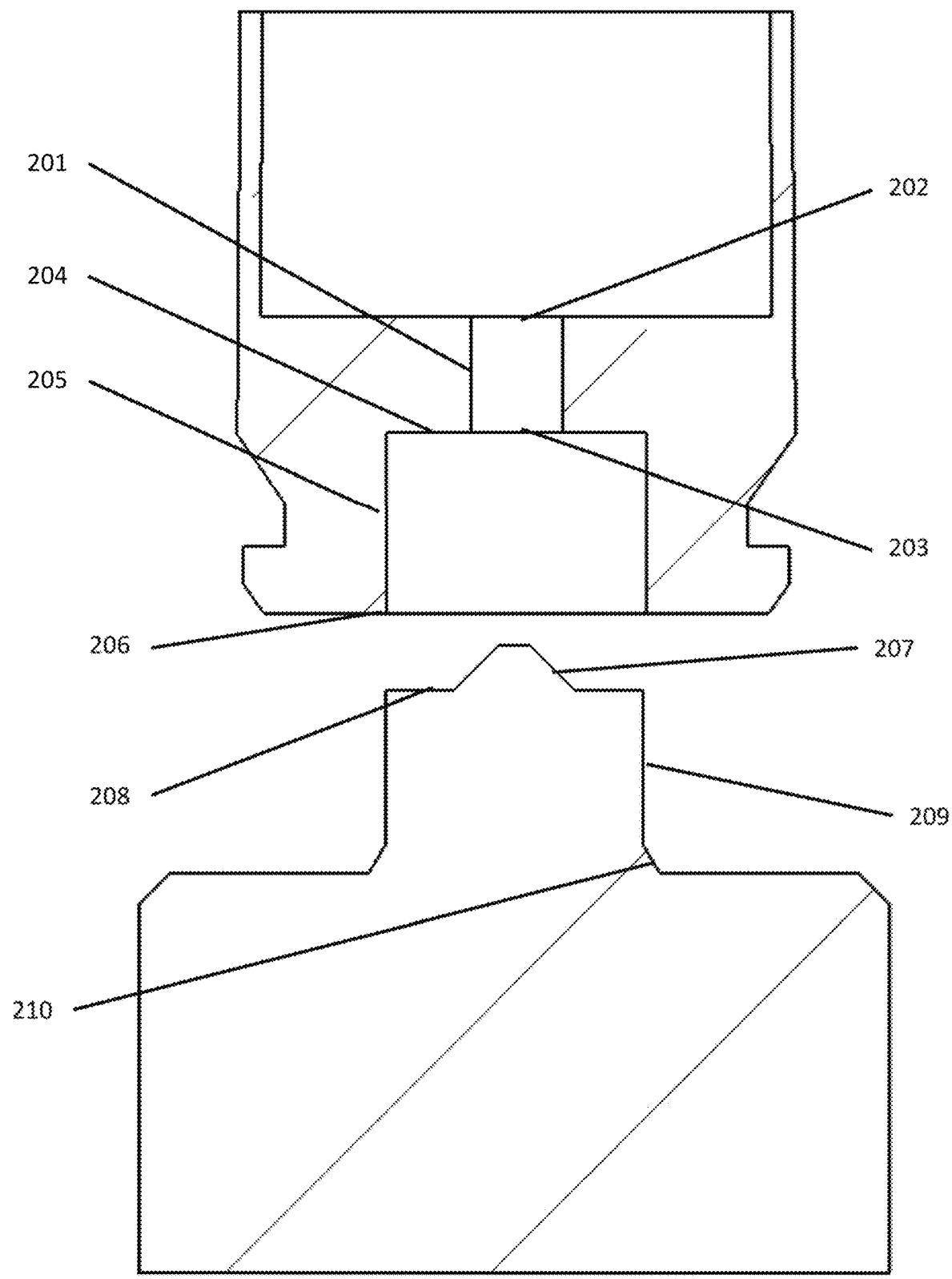
FIG. 2A        200a

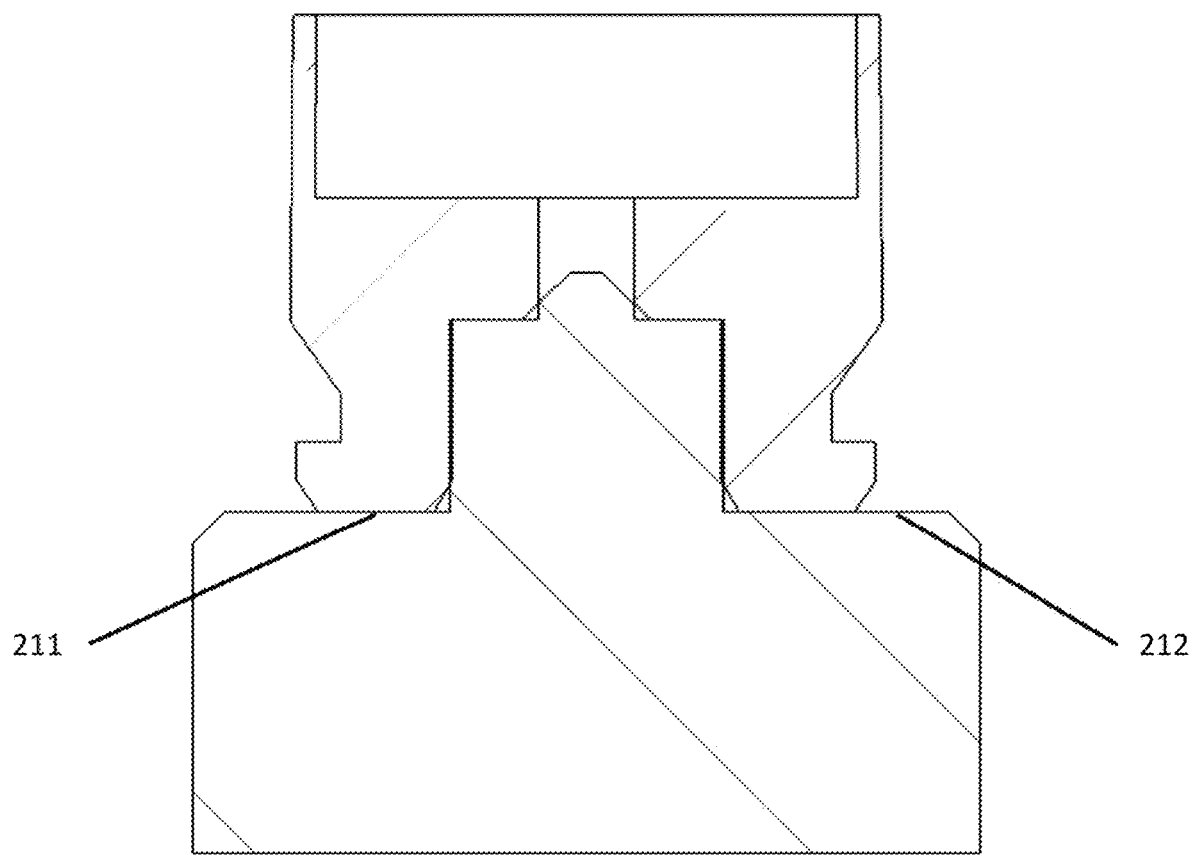
FIG. 2B　　　　200b

MULTIFUNCTION PRIMER POCKET CORRECTION TOOL AND METHOD OF USING SAME

FIELD OF THE INVENTION

The present invention relates generally to precision firearm ammunition reloading and more particularly to tools used in machining, conditioning and correcting a casing primer pocket.

BACKGROUND

One step needed when reloading firearm ammunition is the primer must be removed and replaced. For high accuracy and precision shooting, many reloading factors influence down-range results. Precision reloaders want casings to be identical in every aspect. One of these factors is how the primer flame front engages the powder when firing.

The prior art includes tools to both condition and clean the primer pocket by a face-cutting tool for the base of the primer pocket. Also, the prior art includes a flash hole uniforming tool which is the hole through which the primer flame ignites the powder that provides for a more uniform flame-front entry inside the casing body.

Another challenge for reloaders is that military ammunition requires the primer to be crimped into the casing to provide a mechanical lock. Subsequent reloading of military brass casings and the seating of a new primer requires that this crimp be removed or displaced. There are also several tools in the prior art that cut or swag this interfering material to allow for a new primer.

During the manufacture of a brass casing, the flash hole is punched which leaves a sharp corner at the base of the primer pocket. The corner acts as a restriction for primer flame front going through the flash hole. Consequently, new tools and solutions are needed to better preparing a brass casing for reloading.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIGS. 1C and 1D are perspective views illustrating the multifunction tool shown in FIG. 1A and FIG. 1B respectively.

FIG. 2A is a close-up cross-sectional view illustrating the primary features of the multifunction tool and casing related to the present invention.

FIG. 2B is a cross-sectional view illustrating the contact and interaction of multifunction tool and casing.

DETAILED DESCRIPTION

Figure 1A:
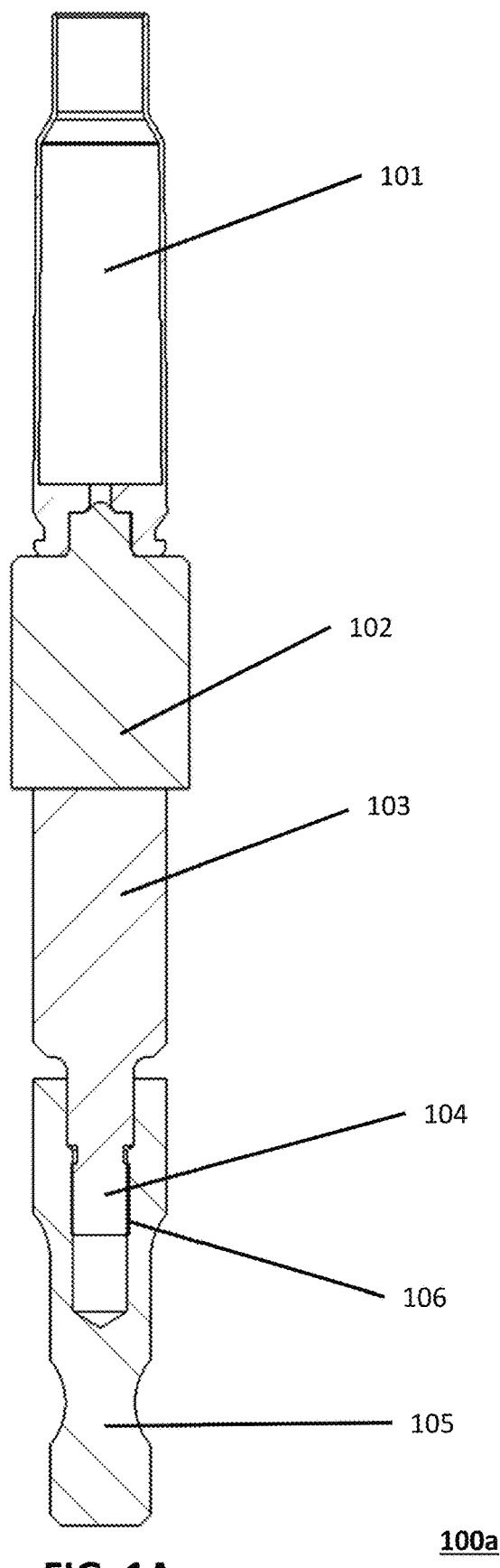
FIG. 1A is a cross-sectional view illustrating a multi-piece multifunction primer tool and casing according to a first embodiment of the invention.

Before describing in detail embodiments that are in accordance with the present invention, it should be observed that the embodiments reside primarily in combinations of method steps and apparatus components related to a primer pocket correction tool generally for reloading ammunition. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 1B:
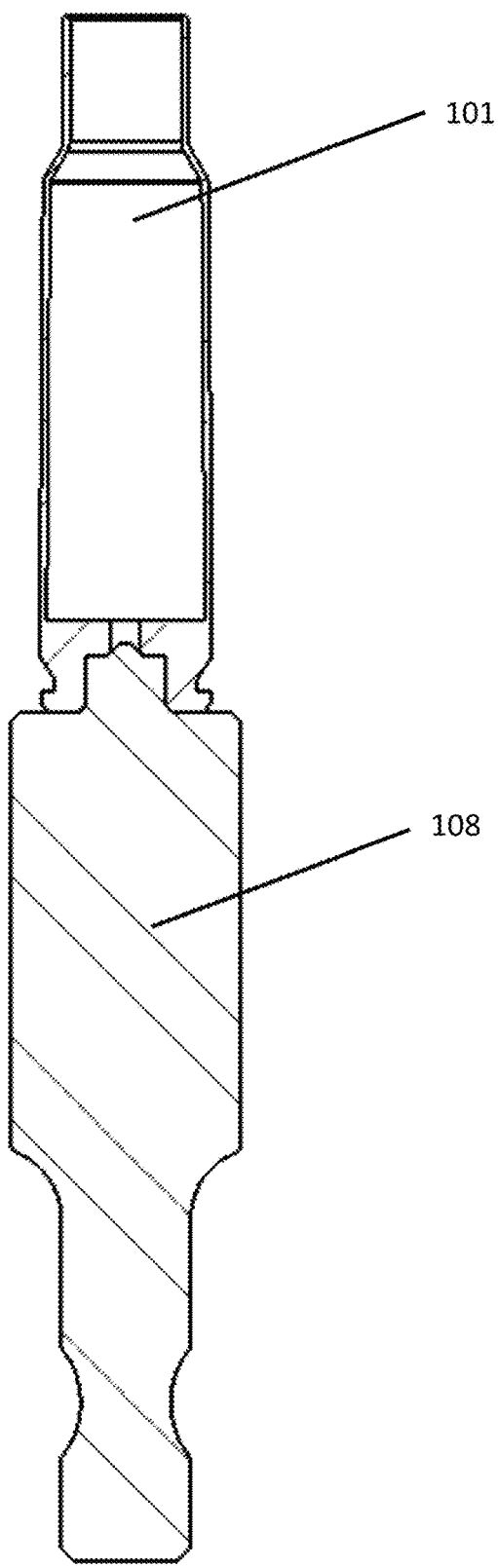
FIG. 1B is a cross-sectional view illustrating a single-piece multifunction tool and casing according to a second embodiment of the invention.

FIG. 1A is a section view illustrating a multi-piece multifunction primer pocket uniforming tool and casing. FIG. 1B is a section view illustrating a single-piece multifunction tool and casing while FIGS. 1C and 1D are perspective views of FIG. 1A AND FIG. 1B respectively. With regard to each of FIG. 1A to FIG. 1D, the multifunction tool 102 and 108 of the present invention works to solve existing primer pocket inconsistencies of brass casings 101 for precision reloading of ammunition. More specifically, the multifunction tool is a multi-piece multifunction tool for use in uniforming sizes at the bottom end of a brass shell casing 101. The multifunction tool includes a cutting head 102, an adapter 103 having a shank 104 with threads 106 or other means to attach to a hex driver 105 for use with a power drill or the like. As seen in FIG. 1B cross-sectional view, the single-piece multifunction tool 108 combines all the features of the cutting head 102, adapter 103, threads 104 and hex driver 105 into a single device. FIGS. 1C and 1D are perspective views illustrating the multifunction tool in its multipiece and single piece embodiments. Although a hex driver 105 is illustrated in the various embodiments, those skilled in the art will recognize that a threaded drive might also be used so that various adapters can be connected to the multifunction tool 102 for use rotary machines as needed.

FIG. 2A is a close-up cross-sectional view illustrating the primary features of a multifunction tool and casing related to the present invention. The one or more flutes, gullets, gashes, and cutting edges are omitted to simply the figures. FIG. 2B is a cross-sectional view illustrating the contact and interaction of multifunction tool and casing. As seen in FIG. 2A, a flash hole 201 has an interior/body aperture 202, and exterior/primer-pocket aperture 203 which is chamfered by cutting geometry 207. The primer pocket base 204 typically has brass material removed by cutting geometry 208.

In use, the entire multifunction tool is axially guided and aligned with the casing by the primer pocket inside diameter 205 with the cutter pilot 209. The exterior primer pocket aperture 206, where the military crimp is applied, is chamfered by cutting geometry 210. As seen in FIG. 2B, the depth of cutting action of the multifunction tool is controlled by the base of the casing 211 making contact with the cutter hard-stop 212. There are numerous sizes and variations to the cutting geometry to accommodate various caliber, primer, and flash hole sizes.

The method of using the multifunction tool begins where a brass firearm casing is prepared for machining its casing primer pocket. As described above, the multifunction tool is a "uniforming" type tool used for providing a consistent and sure primer pocket depth so to hold the primer at the base of the casing. The term "unforming" means to remain the same in all cases and at all times and/or unchanging in form or character. As described herein, the multifunction tool is used by following the steps of a) cutting the primer pocket through the bottom end of the firearm casing to a predetermined depth; b) cutting a chamfer on the primer pocket leading-edge on a base of the casing; c) cutting a chamfer on the flash-hole leading-edge at a base of the primer pocket; d) guiding the tool using an inner diameter of the primer pocket; and e) stopping cutting action by contacting the casing base. Those skilled in the art may also recognize that in some instances, it may be necessary to use a case holder to secure difficult to hold cases during operation of the tool.

Thus, embodiments of the present invention are directed to a multifunction primer pocket correction tool for use in removing and replacing an ammunition primer during reloading. The tool features three (3) cutting features in one operation viz. a) primer pocket depth cutting which is excellent for cleaning primer pockets of fired brass; b) chamfering of the flash hole which creates a lead-in or the flame front to improve consistency; and c) chamfering of the primer pocket that creates a lead-in or primer installation and effectively removes military crimps such as ring and 3-point types. In use, the invention allows for precision reloading by providing the proper cutting and sizing of chamfered edges so that an ammunition case can be identically sized during reloading to enable highly accurate shooting.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A multifunction primer pocket cutting tool for use in reloading firearm ammunition comprising:
   a cutting head:
   an adapter having a shank;
   a hex driver attaching to the shank for use with a power drill tool;
   wherein the multifunction cutting tool is used in machining a casing primer pocket in preparation for a firearm ammunition reload; and
   wherein the cutting head is configured to cut primer pocket depth, chamfer a flash hole and chamfer a primer pocket.

2. A multifunction primer pocket cutting tool as in claim 1, wherein the tool has at least three cutting features in one operation.

3. A multifunction primer pocket cutting tool as in claim 2, wherein the cutting features are primer pocket depth cutting, chamfering of a flash hole, and chamfering of the primer pocket.

4. A method for preparing a firearm casing for reloading using a singular primer pocket cutting tool using the steps of:
   providing a singular primer pocket cutting tool and using the singular primer pocket cutting tool to perform the steps of:
   a) cutting a primer pocket through the bottom end of a firearm casing to a predetermined depth;
   b) cutting a chamfer on the primer pocket leading-edge on a base of the casing;
   c) cutting a chamfer on the flash-hole leading-edge at a base of the primer pocket;
   d) guiding the tool using an inner diameter of the primer pocket; and
   e) stopping cutting action by contacting the casing base.

5. A multifunction cutting tool for use in reloading firearm ammunition comprising:
   a cutting head:
   an adapter having a shank with a threaded body;
   a hex driver attaching to the shank for use with a power drill tool; and
   wherein the cutting tool performs the steps of:
   a) using the cutting head to cut a primer pocket through the bottom end of a firearm casing to a predetermined depth;
   b) cutting a chamfered surface on the primer pocket leading-edge on a base of the casing;
   c) cutting a chamfered surface on the flash-hole leading-edge at a base of the primer pocket;
   d) guiding the tool using an inner diameter of the primer pocket; and
   e) stopping cutting action by contacting the casing base.

6. A multifunction cutting tool as in claim 5, wherein the cutting tool is multipurpose having at least three cutting functions.

* * * * *